UNITED STATES PATENT OFFICE.

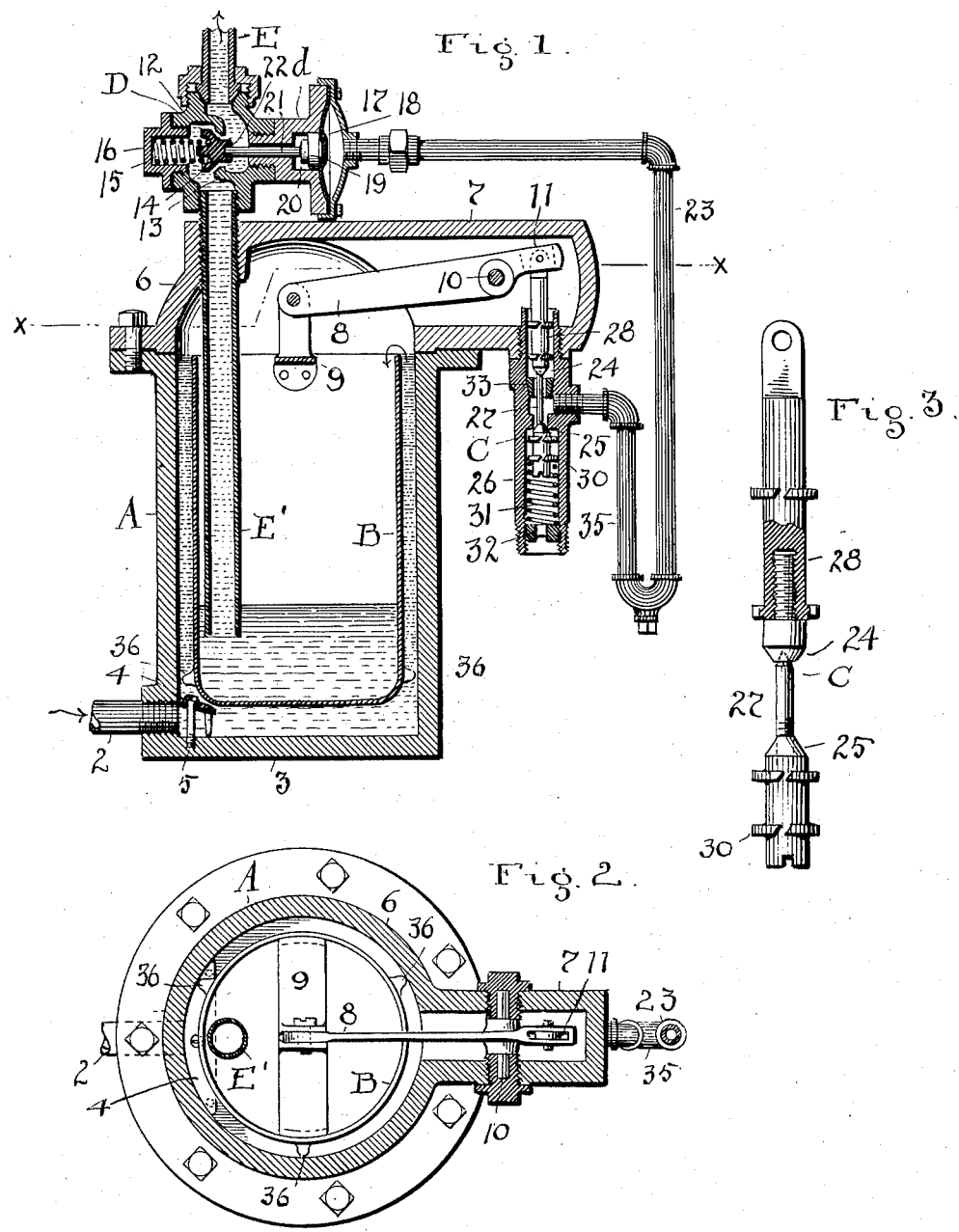

FRANK P. HAMILTON, OF CLEVELAND, OHIO.

STEAM-TRAP.

No. 868,659.     Specification of Letters Patent.     Patented Oct. 22, 1907.

Application filed December 18, 1905. Serial No. 292,172.

*To all whom it may concern:*

Be it known that I, FRANK P. HAMILTON, a citizen of the United States, residing at Cleveland, in the county of Cuyahoga and State of Ohio, have invented certain new and useful Improvements in Steam-Traps; and do declare that the following is a full, clear, and exact description of the invention, which will enable others skilled in the art to which it appertains to make and use the same.

My invention relates to improvements in steam traps, and the improvement consists in the construction and arrangement of parts adapted to collect and dispose of the waters of condensation and other accumulations in the line of steam pressure, all substantially as shown and described and more particularly pointed out in the claims.

My improved device is self contained, and is automatic in operation and adapted to provide full and instantaneous opening and closing of the valve for the discharge and collection of the water within the trap and is further designed to eliminate the wire drawing action which causes cutting of the valve at its seat and thereby prolong the life and durability of the valve and trap.

Other objects are embodied in the details of construction which make the trap simple of construction and positive in action, as well as easy of access to the interior parts for examining and repairing purposes.

In the accompanying drawings Figure 1 is a central vertical section of my improved steam trap, and Fig. 2 is a cross section thereof on line $x, x$, Fig. 1. Fig. 3 is an enlarged sectional detail view of the pilot and relief valves for controlling the water discharge valve.

The steam trap comprises a cylindrical receptacle A, having an inlet pipe 2 for the condensed water screwed into one side and above bottom 3. A spreader plate 4 is detachably secured to bottom 3 by screw 5 and arranged to cover the mouth of the inlet opening and cause the incoming water to spread over the bottom at a slow and even velocity and without jarring the bucket, or float cup B. A hollow cover or cap 6 having a side extension 7 is bolted to the flanged top portion of receptacle A, and said cover supports all the practical working parts of the steam trap. Said parts are bodily removable with cover 6 making this construction very easy to examine and repair when necessity requires.

The primary operative element for my steam trap comprises a bucket or float cup B which is open at its top and pivotally suspended from the free end of long lever 8 by ears on cross bar 9 riveted or secured to bucket B. Lever 8 is pivotally supported upon a pin 10 mounted in bearing screws in the walls of extension 7, and a short arm 11 of said lever is adapted to operate a pilot valve or valve mechanism C which controls the opening and closing of the main discharge valve D for the trap. Valve D is mounted in the line of the discharge pipe E, the lower extension E' of which is secured to depend from cap 6 and projects downward into bucket or float cup B to within a short distance of its bottom. Valve D comprises main body 12 having a central division wall 13 which contains a central opening and seat for valve member 14 and which is of such size as to permit a full and free discharge of the waters when open. A light spiral spring 15 resting within hollow nut 16 bears against valve member 14 to keep it upon its seat. A tubular casing $d$ is screwed into body 12 opposite valve member 14, and a concave cap 17 is secured to the outer face of casing $d$ and clamps a metallic or rubber diaphragm 18 in place between them. Diaphragm 18 bears against movable disk or plunger 19 freely mounted within a chamber 20 of its own within casing $d$, and which disk or plunger bears against the end of free rod 21 adapted to slide within tubular casing $d$. Rod 21 rests freely at its inner end within socket 22 of valve member 14 and is adapted to carry said valve away from its seat against the steam pressure and spring 15 when the live pressure from within the trap is permitted to pass pilot valve C and travel through pipe connections 25 to act upon diaphragm 18. Diaphragm 18 has preferably about four times the exposure area over and above valve member 14.

Pilot valve C is in reality a double acting valve member comprising a live pressure valve 24 and a relief valve 25, each of which is a separate removable member having a tapering tip end adapted to close upon tapering seats oppositely disposed to each other in the central passage within valve body 26. Said valve members are opposed to each other and are connected by an intermediate pin or rod 27 which has a tapered end engaged within a tapering recess in the bottom of valve member 24 and is screwed into the upper end of valve member 25. When one or the other of said members is seated to close the passage through body 26 the other member is away from its seat to open the passage either above or below the pipe connection 23 which enters body 26 at an intermediate point between the valve seats in said body. Member 24 is in reality a mere valve tip of any suitable metal adapted to withstand the wear occasioned by its use, and said tip is removably supported within the hollow end of link connection 28 which is pivotally suspended from short arm 11 of lever 8. Member 25 is likewise a removable tip similar in construction to member 25, and is also removably mounted within the hollow body 26. A spring 31 resting upon nut 32 screwed within the lower end of body 26 is adapted to bear against flange 30 of member 25 and serves to hold said member in engagement with its seat and in operative relation with the other valve parts. Nut 32 has an opening through its center which gives open communication with the outside atmosphere to relieve the pressure upon diaphragm 18 when member 24 is seated. The valve seat for member 24 is preferably formed in a separate tubular portion 33 slightly tapering upon its outside so as to be driven and wedged in place within body 26, and is adapted to be removed and replaced after long usage.

The operation of the device is as follows:—Presuming that the steam trap is connected and in the line of pressure and that the water of condensation is flowing into receptacle A, and that bucket B is in its lowest position with valve 24 open and relief valve 25 closed, it is seen that the water first spreads evenly over the bottom of receptacle A as caused by spreader plate 4 and then rises to about 1¼ inches above the bottom of the bucket before the bucket becomes buoyant and rises and is in turn lifted to close valve member 24 and open relief valve member 25. This then permits the main discharge valve D to close because the pressure from within the trap is relieved from diaphragm 18. The water now continues to rise within receptacle A until it overflows the top edge of bucket B and fills the same to about one inch from the top, which causes the bucket to drop to its former position as it is now water logged or in a state of gravity. In dropping, lever 8 operates to open the pressure controlling valve 24 and spring 31 closes the atmosphere or relief valve 25. The live pressure within the trap now acts against diaphragm 18 and as the exposed surface of the diaphragm is far greater than that of valve member 14 and as supplemented by its light spring, valve D is instantaneously and fully opened to permit the discharge of the water from within the bucket and trap through pipe E and E', and which occurs through the steam pressure within the trap and as received from the line. As long as the water continues to overflow the upper edge of the bucket the flow through pipe E' is continuous, but as soon as the flow of water is stopped the water from within the bucket is discharged until only about 1¼ inches depth of water remains in the bucket, and the bucket thereupon becomes buoyant and again rises, thereby closing valve 24 and opening relief valve 25 which permits valve D to instantly close and stop the discharge of water through pipe E.

I have found that with this construction the discharge valve will not cut out the seat as is customarily the case, and that the life thereof is very much prolonged, and the operation of the device is accordingly more reliable and certain. The valve members or tips 24 and 25 may be renewed at a small cost or they can be recut and used again several times before they are finally worn out.

One of the advantages of my construction is that the hanging lever and other actuating parts are all within the top of the trap and above the water line where they will not become foul with sediment or dirt, and which when so fouled or limed up causes the parts to stick and bind in their movements making the trap inoperative at times.

Pipe connection 23 is preferably formed with a U shaped trap portion 35 adapted to hold a certain amount of the water of condensation. This water cools and becomes the medium which acts upon diaphragm 18 when the live pressure from the trap forces it upward. Diaphragm 18 is therefore less exposed to the steam and will not so readily deteriorate.

Bucket or float cup B has a series of side projections 36 adapted to engage the wall of receptacle A to keep the bucket from tilting and to ride evenly on the water within receptacle A.

What I claim is:—

1. In a steam trap, a receptacle and float member therein, a discharge pipe and valve therefor, a device adapted to open said valve by the pressure from within said receptacle, a pressure controlling valve having operative connections with said float member, and an atmospheric relief valve for said device having a separable connection with said pressure valve and a spring adapted to close said relief valve when said pressure valve is opened.

2. In a steam trap, a water receptacle having a removable cover, a discharge pipe and a valve therefor mounted on said cover, a device adapted to open said valve, steam pressure connections between said device and said receptacle, a bucket within said receptacle and lever connections therefor pivotally mounted upon said cover, a pressure valve operatively connected with said lever adapted to regulate the flow of pressure to said device and connections, and a relief valve for said device adapted to be opened upon the closing of said pressure valve.

3. In a steam trap, a water receptacle and a bucket therein, a discharge pipe and valve therefor, a device adapted to open said valve by the pressure from within said receptacle, steam passages leading from said receptacle to said device, and a set of valves having operating connections with said bucket adapted to open and close said passages and comprising a pressure valve, and a relief valve open to the atmosphere, and separable connections for said pressure and relief valves.

4. A steam trap and means controlled by the pressure from within the trap adapted to regulate the flow of water from said trap, and pressure and relief valves for said means comprising axially alined and opposed valve tips and supporting members therefor, and a separating connection between said tips.

5. A steam trap and means controlled by the pressure from within the trap adapted to regulate the flow of water from said trap, and a pressure and relief valve device for said means comprising a body with a central passage and a side steam passage, valve seats and a valve members within said body, a removable connecting pin for said valve members, and a spring adapted to seat the relief valve member.

6. A steam trap comprising a water receptacle having a removable cover, a depending discharge pipe mounted upon said cover, a valve for said pipe, a pressure controlled opening device for said valve, pipe connection having a trap portion between said device and said receptacle, a valve body in the line of said connection, a pressure valve and a relief valve within said body, and a lever and bucket float supported on said cover having operative connections with said pressure and relief valves.

7. In a steam trap, a pressure receptacle having a discharge pipe and valve therefor, a pressure controlled device for said valve, pressure conveying pipes between said device and receptacle having a U shaped trap portion in the line thereof, a relief connection for said pipes and devices, and a pair of connected valves and float operated means therefor adapted to close one of said valves in opening the other and whereby the pressure from within the receptacle is prevented from escaping when acting upon the pressure device.

In testimony whereof I sign this specification in the presence of two witnesses.

FRANK P. HAMILTON.

Witnesses:
R. B. MOSER,
C. A. SELL.